(12) United States Patent
Murooka

(10) Patent No.: US 9,359,064 B2
(45) Date of Patent: Jun. 7, 2016

(54) FAN ROTOR BLADE AND FAN

(75) Inventor: Takeshi Murooka, Tokyo (JP)

(73) Assignee: IHI Corporation, Tokyo (JP)

( * ) Notice: Subject to any disclaimer, the term of this patent is extended or adjusted under 35 U.S.C. 154(b) by 446 days.

(21) Appl. No.: 13/997,834

(22) PCT Filed: Dec. 16, 2011

(86) PCT No.: PCT/JP2011/079215
§ 371 (c)(1),
(2), (4) Date: Jun. 25, 2013

(87) PCT Pub. No.: WO2012/090736
PCT Pub. Date: Jul. 5, 2012

(65) Prior Publication Data
US 2013/0323065 A1 Dec. 5, 2013

(30) Foreign Application Priority Data

Dec. 28, 2010 (JP) ................. 2010-292658

(51) Int. Cl.
*B64C 11/00* (2006.01)
*F04D 29/32* (2006.01)
*F01D 5/14* (2006.01)

(52) U.S. Cl.
CPC ............ *B64C 11/00* (2013.01); *F01D 5/141* (2013.01); *F01D 5/147* (2013.01); *F04D 29/324* (2013.01); *F05D 2240/303* (2013.01); *Y02T 50/672* (2013.01); *Y02T 50/673* (2013.01)

(58) Field of Classification Search
CPC ........ F01D 5/141; F01D 5/147; F04D 29/324
See application file for complete search history.

(56) References Cited

U.S. PATENT DOCUMENTS

| 5,129,787 A | * | 7/1992 | Violette ............. B29D 99/0028 416/217 |
| 5,167,489 A | * | 12/1992 | Wadia ..................... B64C 11/18 415/182.1 |
| 6,079,948 A | | 6/2000 | Sasaki et al. |

(Continued)

FOREIGN PATENT DOCUMENTS

| CN | 1179503 A | 4/1998 |
| CN | 1580495 A | 2/2005 |

(Continued)

OTHER PUBLICATIONS

International Search Report Issued Feb. 28, 2012 in PCT/JP11/079215 Filed Dec. 16, 2011.

(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A fan rotor blade has a rotor blade leading edge. On a hub side of the rotor blade leading edge, a vertical hub section is formed. From a top end of the vertical hub section to a mid-span side of the rotor blade leading edge, a backward tilt mid-span section is formed. From a top end of the backward tilt mid-span section to a tip end of the rotor blade leading edge, a forward tilt tip section is formed. From a hub end of the rotor blade leading edge to a base end of the vertical hub section, a backward tilt hub section is formed. The backward tilt hub section is backwardly tilted so that a top end thereof is positioned behind a base end thereof.

6 Claims, 7 Drawing Sheets

(56) References Cited

U.S. PATENT DOCUMENTS

| | | | |
|---|---|---|---|
| 6,328,533 B1 * | 12/2001 | Decker | F01D 5/141 416/223 A |
| 2005/0031454 A1 | 2/2005 | Doloresco et al. | |
| 2009/0074586 A1 | 3/2009 | Le Hong et al. | |
| 2009/0304518 A1 | 12/2009 | Kodama et al. | |
| 2010/0150729 A1 * | 6/2010 | Kirchner | F01D 5/12 416/223 R |
| 2010/0232970 A1 | 9/2010 | Murooka et al. | |
| 2011/0020130 A1 | 1/2011 | Murakami et al. | |
| 2013/0008170 A1 * | 1/2013 | Gallagher | F01D 5/141 60/772 |

FOREIGN PATENT DOCUMENTS

| | | |
|---|---|---|
| CN | 101387205 A | 3/2009 |
| JP | 10 103002 | 4/1998 |
| JP | 2001 214893 | 8/2001 |
| JP | 2005 54798 | 3/2005 |
| JP | 2007 315303 | 12/2007 |
| JP | 2008 14182 | 1/2008 |
| JP | 2009 68493 | 4/2009 |
| RU | 2 113 627 C1 | 6/1998 |
| WO | 2009 119830 | 10/2009 |

OTHER PUBLICATIONS

Decision on Grant issued on Dec. 1, 2014 in Russian Patent Application No. 2013134982 with English translation.

Combined Chinese Office Action and Search Report issued Apr. 3, 2015 in Patent Application No. 201180062674.9 (with English translation and English translation of categories of cited documents).

* cited by examiner (a)

(b)

FF ← → FR

FAN ROTOR BLADE AND FAN

TECHNICAL FIELD

The present invention relates to a fan rotor blade and the like used for a fan that takes air into a core flow path and bypass flow path in an engine case of an aircraft engine.

BACKGROUND ART

Various developments have been made in connection with the shapes of fan rotor blades. The inventors of this application have developed and filed patent applications for fan rotor blades that sufficiently secure structural strength and improve aerodynamic performance. For example, a related art of Japanese Unexamined Patent Application Publication No. 2007-315303 discloses a fan rotor blade whose detailed structure is as mentioned hereunder.

On a hub side of a rotor blade leading edge, there is formed a vertical hub section that is vertical to an axial center of a fan (an axial center of an aircraft engine). A base end (an inner end in a diametral direction) of the vertical hub section is positioned at a hub end of the rotor blade leading edge. From a top end (an outer end in the diametral direction) of the vertical hub section to a mid-span side of the rotor blade leading edge, there is formed a backward tilt mid-span section. The backward tilt mid-span section tilts backward so that a top end thereof is positioned behind (downstream of) a base end thereof. Further, from the top end of the backward tilt mid-span section to a tip end of the rotor blade leading edge, there is formed a forward tilt tip section. The forward tilt tip section tilts forward so that a top end thereof is positioned ahead of a base end thereof.

The vertical hub section is vertical to the axial center of the fan, and compared with tilting the hub side (hub side section) of the rotor blade leading edge backward without forming the vertical hub section on the hub side of the rotor blade leading edge, a sufficient chord length is secured on the hub side of the fan rotor blade. Since the forward tilt tip section tilts forward, an inflow velocity of air on the tip side becomes slower compared with tilting the tip side (tip side section) of the rotor blade leading edge backward, to thereby reduce a shock wave loss on the tip side of the fan rotor blade. Since the backward tilt mid-span section tilts backward, a barycenter of the fan rotor blade is suppressed from being forwardly biased due to the formation of the forward tilt tip section, to reduce stress around the hub end of the rotor blade leading edge. This results in securing sufficient structural strength for the fan rotor blade and improving the aerodynamic performance thereof such as a hub-side pressure ratio, tip-side fan efficiency, and the like.

SUMMARY OF INVENTION

Problem to be Solved by Invention

Recent years, a requirement for improving the efficiency of aircraft engines is increasing. Accordingly, it is needed to sufficiently secure the structural strength of a fan rotor blade and further improve the aerodynamic performance of the fan rotor blade, in particular, the tip-side fan efficiency thereof.

The present invention provides a novel fan rotor blade and the like that meet the above-mentioned requirements.

Means to Solve Problem

According to a technical aspect of the present invention, there is provided a fan rotor blade used for a fan that takes air into an annular core flow path that is formed inside an engine case of an aircraft engine and an annular bypass flow path that is formed inside the engine case concentrically with and outside the core flow path. The fan rotor blade has a rotor blade leading edge that includes a vertical hub section that is formed on a hub side and is substantially vertical to an axial center of the fan (an axial center of the aircraft engine), a backward tilt mid-span section that is formed from a distal end (an outer end in a diametral direction) of the vertical hub section to a mid-span side and is backwardly tilted (swept) so that a distal end thereof is positioned behind (downstream of) a proximal end (an inner end in the diametral direction) thereof, a forward tilt tip section that is formed from the distal end of the backward tilt mid-span section to a tip side and is forwardly tilted (swept) so that a distal end thereof is positioned ahead (upstream) of a base thereof, and a backward tilt hub section that is formed from a hub end to the proximal end of the vertical hub section and is backwardly tilted so that a distal end thereof is positioned behind a proximal end thereof.

In this specification and scope of claims, the "fan rotor blade" not only means a fan rotor blade in a narrow sense but also covers a compressor rotor blade. "Vertical to an axial center of a fan" covers a range of plus/minus five degrees with respect to a plane that is normal to the axial center of the fan. "Upstream" means an upstream side in a main flow direction and "downstream" means a downstream side in the main flow direction.

According to another aspect of the present invention, there is provided a fan that takes air into an annular core flow path that is formed inside an engine case of an aircraft engine and a bypass flow path that is formed inside the engine case concentrically with and outside the core flow path. The fan includes a fan disk that is arranged to be rotatable around an axial center in the engine case and is provided with a plurality of fitting grooves on an outer circumferential face thereof at regular intervals in a circumferential direction and the above-mentioned fan rotor blade that is fitted into each of the fitting grooves of the fan disk.

MODE OF IMPLEMENTING INVENTION

First Embodiment

Figure 1:
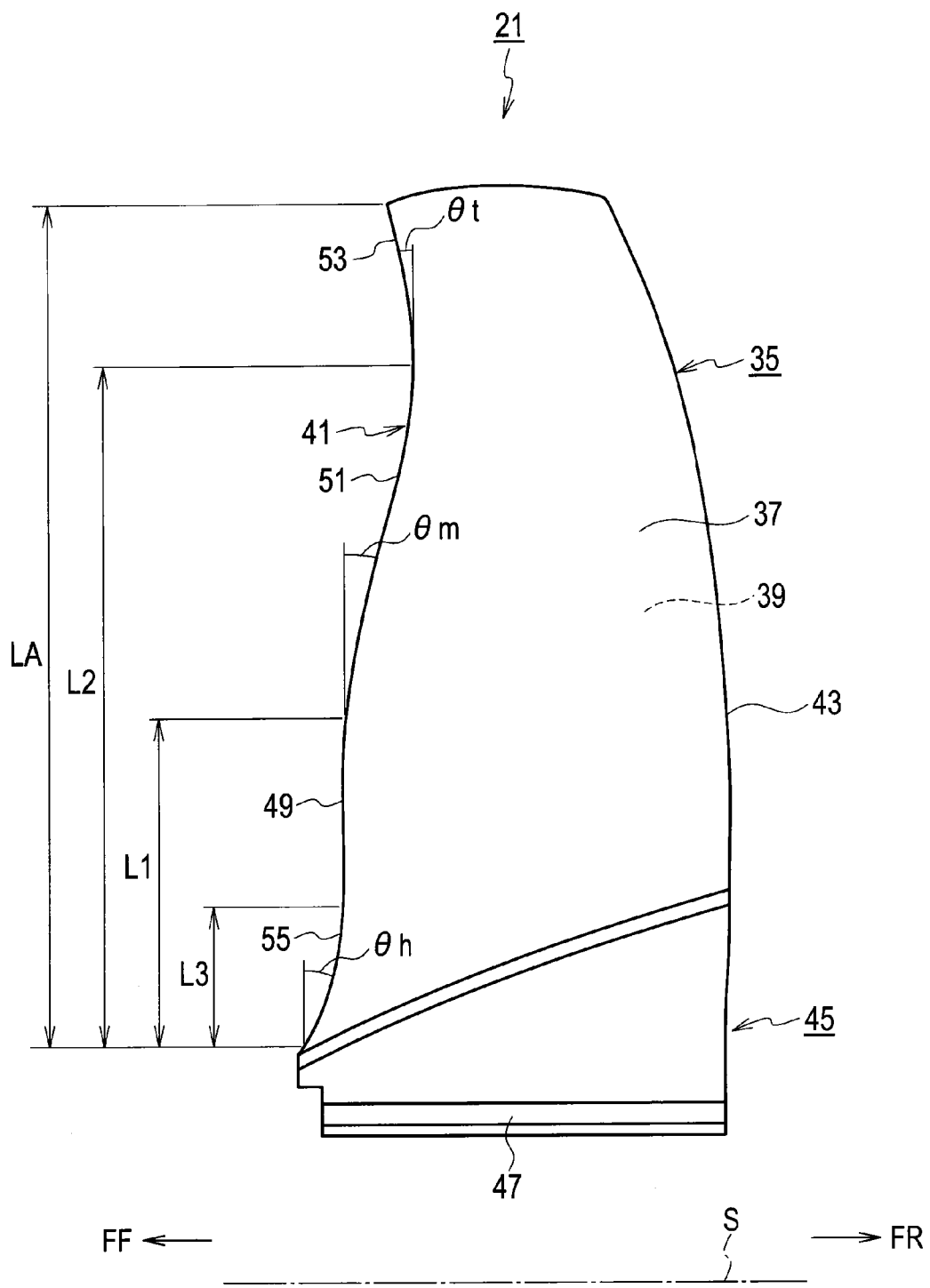
FIG. 1 is a side view of a fan rotor blade according to a first embodiment of the present invention.

The first embodiment of the present invention will be explained with reference to FIG. 1 to FIGS. 3(a) and 3(b). In the drawings, "FF" indicates a front direction and "FR" a rear direction.

Figure 2:
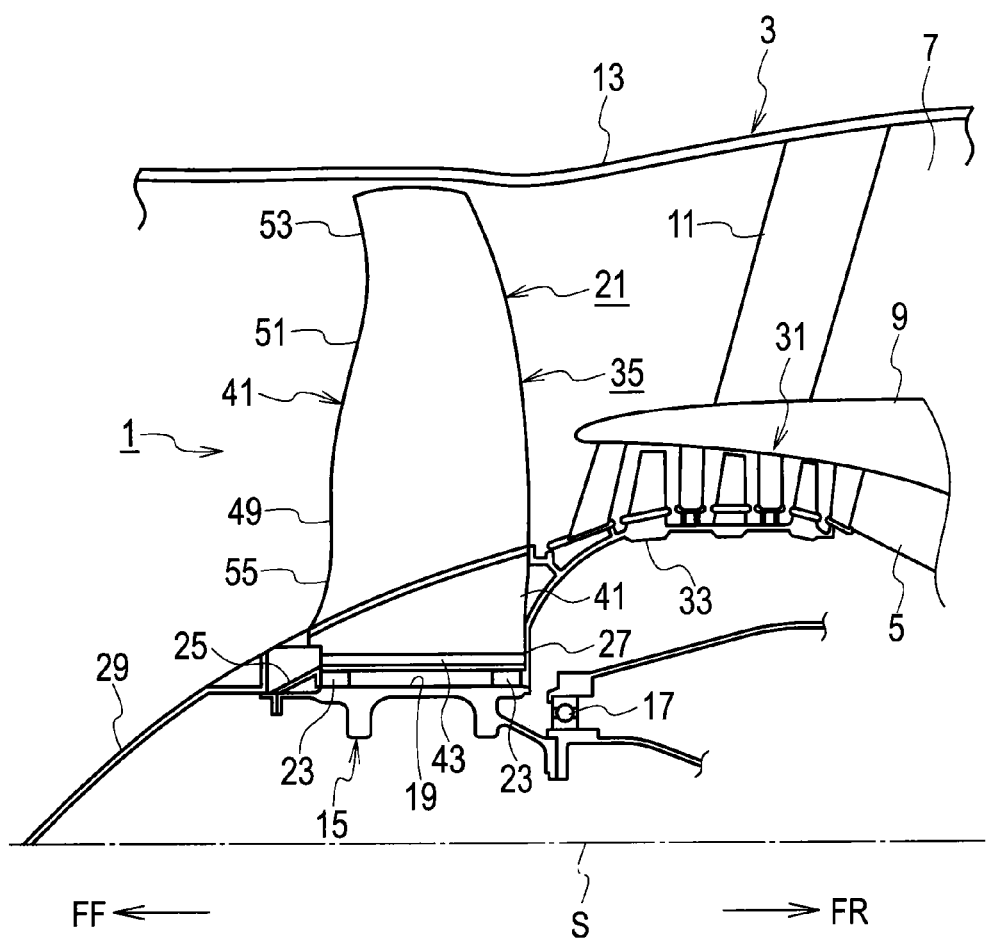
FIG. 2 is a partly sectioned side view of a front part of an aircraft engine according to the first embodiment of the present invention.
Figure 3:
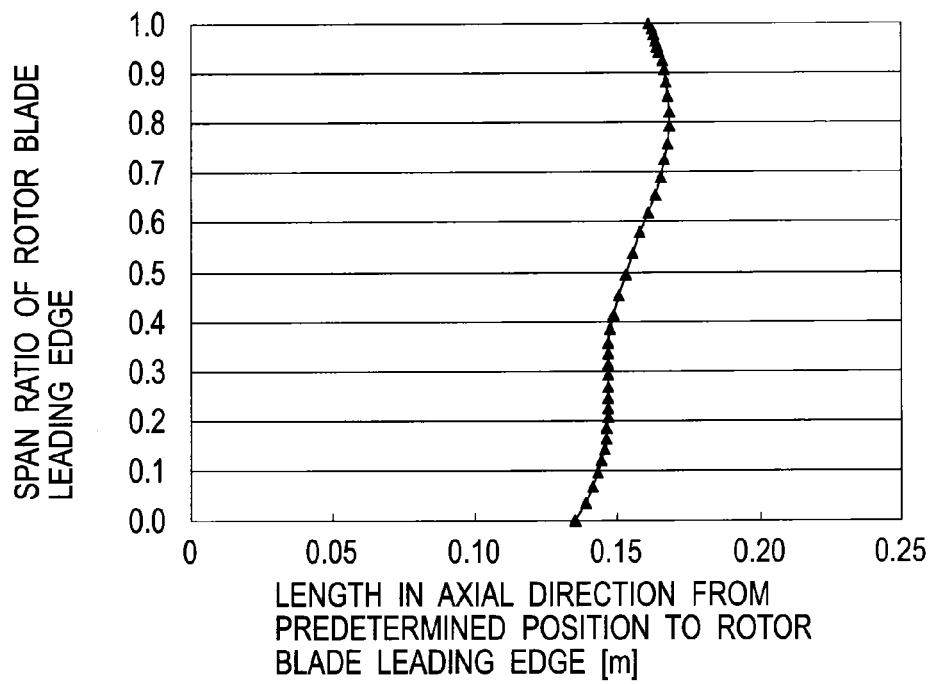
FIG. 3($a$) is a view illustrating a relationship between a length in an axial direction from a predetermined position to a rotor blade leading edge and a span ratio of the fan rotor blade leading edge and FIG. 3($b$) is a view illustrating a relationship between a sweep angle of the fan rotor blade leading edge and a span ratio of the fan rotor blade leading edge.
Figure 3:
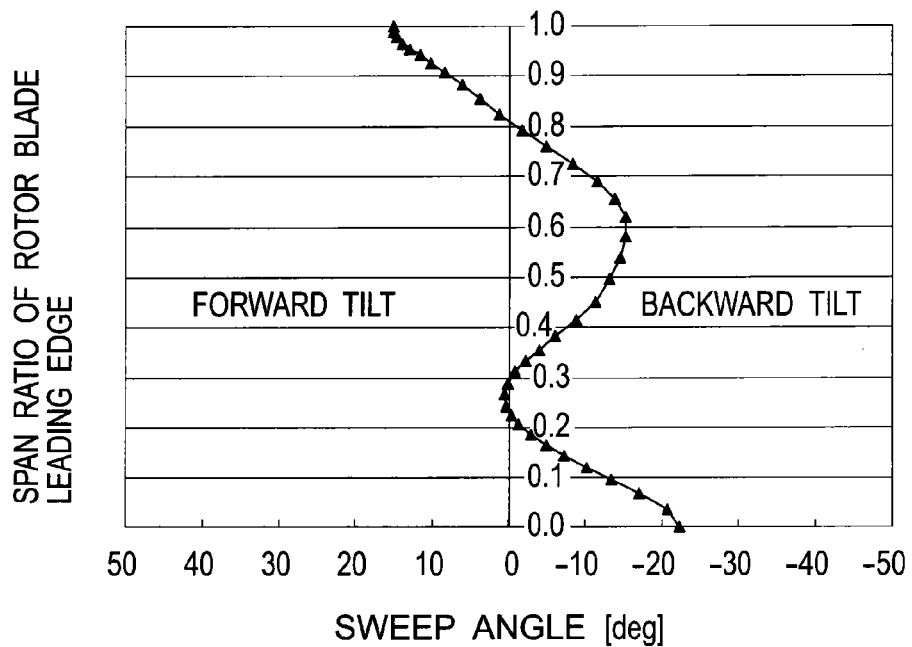

As illustrated in FIG. 2, a fan 1 according to the first embodiment of the present invention takes air into an annular core flow path (main flow path) 5 that is formed in an engine case 3 of an aircraft engine and a bypass flow path 7 that is formed in the engine case 3 concentrically with and outside the core flow path 5. The engine case 3 has a cylindrical core cowl 9, a cylindrical fan case 13 arranged outside the cylindrical core cowl 9 to surround the same through a plurality of (only one is illustrated) struts 11, and the like. The core flow path 5 is defined inside the core cowl 9 and the bypass flow path 7 is defined with an outer wall of the core cowl 9 and an inner wall of the fan case 13. A configuration of the fan 1 according to the first embodiment of the present invention will briefly be explained.

In front of the core cowl 9, a fan disk 15 is rotatably arranged through a bearing 17. The fan disk 15 is concentrically and integrally connected to a plural stages of low-pressure turbine rotors (not illustrated) of a low-pressure turbine (not illustrated) arranged behind the fan 1. In an outer circumferential face of the fan disk 15, there are formed a plurality of fitting grooves (fitting notches) 19 at regular intervals in a circumferential direction.

To each of the fitting grooves 19 of the fan disk 15, a fan rotor blade 21 is fitted. Between a bottom face (an inner face) of each fitting groove 19 of the fan disk 15 and each fan rotor blade 21, there are arranged a plurality of spacers 23 at front and rear positions. A front side of the fan disk 15 is integral with an annular front retainer 25 to support the plurality of fan rotor blades 21 from front. A rear side of the fan disk 15 is integral with an annular rear retainer 27 to support the plurality of fan rotor blades 21 from behind. The front retainer 25 is integrally connected to a nose cone 29. The rear retainer 27 is concentrically and integrally connected to a low-pressure compressor rotor 33 of a low-pressure compressor 31 arranged behind the fan 1.

Accordingly, as the aircraft engine is started to rotate the fan disk 15, the plurality of fan rotor blades 21 are rotated together with the fan disk 15, to take air into the core flow path 5 and bypass flow path 7.

A configuration and the like of the fan rotor blade 21 according to the first embodiment of the present invention will be explained.

As illustrated in FIGS. 1 and 2, the fan rotor blade 21 is used for the fan 1 as mentioned above and is made of metal such as titanium alloy. The fan rotor blade 21 has a blade body 35. The blade body 35 has, on one side, a back face (negative pressure face) 37, and on the other side, a front face (positive pressure face) 39. A front edge of the blade body 35 is a rotor blade leading edge 41 of the fan rotor blade 21 and a rear edge of the blade body 35 is a rotor blade trailing edge 43 of the fan rotor blade 21. A base end side of the blade body 35 is integral with a blade root 45. The blade root 45 has a dovetail 47 to be fitted to the fitting groove 19 of the fan disk 15. A boundary (platform) between the blade body 35 and the blade root 45 is located on an extension of an inner wall face of the core flow path 5.

As illustrated in FIGS. 1, 3(a), and 3(b), on a hub side of the rotor blade leading edge 41, there is formed a vertical hub section 49. The vertical hub section 49 is substantially normal to an axial center S of the fan 1 (an axial center of the aircraft engine). In other words, the vertical hub section 49 is set to be within a range of plus/minus five degrees with respect to a plane that is vertical to the axial center of the fan 1.

From a distal end (an outer end in a diametral direction) of the vertical hub section 49 to a mid-span side of the rotor blade leading edge 41, there is formed a backward tilt mid-span section 51. The backward tilt mid-span section 51 is smoothly connected to the vertical hub section 49 and is backwardly tilted so that a distal end thereof is positioned behind (downstream of) a proximal end (an inner end in the diametral direction) thereof. In other words, the backward tilt mid-span section 51 is backwardly swept to have a negative sweep angle. The size of a forward tilt angle (negative sweep angle) θm of the backward tilt mid-span section 51 gradually increases to a negative-value side from the proximal end side toward the distal end side, reaches a maximum value, and gradually becomes smaller toward the distal end side.

Accordingly, a virtual curve defining a hub-side edge of the rotor blade leading edge 41 has a minimum sweep angle at the backward tilt mid-span section 51 as illustrated in FIG. 3(b).

From a top end of the backward tilt mid-span section 51 to a tip end (tip side) of the rotor blade leading edge 41, there is formed a forward tilt tip section 53. The forward tilt tip section 53 is smoothly connected to the backward tilt mid-span section 51 and is forwardly tilted so that a top end thereof is positioned ahead (upstream) of a base end thereof. In other words, a sweep angle θth of the forward tilt tip section 53 has a positive value. The forward tilt angle (positive sweep angle) of the forward tilt tip section 53 becomes gradually larger from a proximal end side toward a distal end side.

From a hub end of the rotor blade leading edge 41 to a base end of the vertical hub section 49, there is formed a backward tilt hub section 55. The backward tilt hub section 55 is smoothly connected to the vertical hub section 49 and is backwardly tilted so that a distal end thereof is positioned behind a proximal end thereof.

The backward tilt angle (negative sweep angle) θh of the backward tilt hub section 55 becomes maximum on the proximal end side, to have a minimum value. Thereafter, the angle gradually becomes larger toward the vertical hub section 49 and is smoothly connected to the vertical hub section 49 having a sweep angle θh of nearly zero. Accordingly, a virtual curve defining a hub-side edge of the rotor blade leading edge 41 has a maximum value in the sweep angle θh in a region extending from the backward tilt hub section 55 through the vertical hub section 49 to the backward tilt mid-span section 51 as illustrated in FIG. 3(b). This results in producing, on the back face of the fan rotor blade 21, a static pressure distribution that may press an airflow toward the hub side and reduce a separation (an airflow separation) on the hub side.

The vertical hub section 49, backward tilt mid-span section 51, and the like are defined with respect to the total span length LA and the like, as mentioned below.

For the vertical hub section 49, a span length L1 from the hub end of the rotor blade leading edge 41 to the top end of the vertical hub section 49 is set to be 20 to 50%, preferably, 30 to 40% of the total span length LA of the rotor blade leading edge 41.

The reason of setting the span length L1 to 20% of the total span length LA or greater is because setting the same to smaller than 20% makes it difficult to sufficiently improve a hub-side pressure ratio. The reason of setting the span length L1 to 50% of the total span length LA or smaller is because setting the same to greater than 50% results in shortening the span length of the backward tilt mid-span section 51 and biasing the barycenter of the fan rotor blade in the front direction, thereby causing concern that excessive stress may be created around the hub end of the rotor blade leading edge 41.

For the backward tilt mid-span section 51, the maximum value of the backward tilt angle θm of the backward tilt mid-span section 51 is set to be 5 to 45 degrees, preferably, 10 to 20 degrees. The reason of setting the maximum value of the backward tilt angle θm of the backward tilt mid-span section 51 to 5 degrees or greater is because setting the same to smaller than 5 degrees results in biasing the barycenter of the fan rotor blade 21 in the front direction due to the formation of the forward tilt tip section 53, thereby causing concern that excessive stress may be created around the hub end of the rotor blade leading edge 41. The reason of setting the maximum backward tilt angle θm of the backward mid-span section 51 to 45 degrees or smaller is because setting the same to greater than 45 degrees results in causing concern that the barycenter of the fan rotor blade 21 is biased in the backward direction, thereby causing concern that excessive stress is created around the hub end of the rotor blade trailing edge 43.

For the forward tilt tip section 53, a span length L2 from the hub end of the rotor blade leading edge 41 to a proximal end (an inner end in the diametral direction) of the forward tilt tip section 53 is set to be 60 to 90%, preferably, 75 to 85% of the total span length LA of the rotor blade leading edge 41. The reason of setting the span length L2 to 60% of the total span length LA or greater is because setting the same to smaller than 60% of the total span length LA results in biasing the barycenter of the fan rotor blade 21 in the forward direction due to the formation of the forward tilt tip section 53, thereby causing concern that excessive stress may be created around the hub end of the rotor blade leading edge 41. The reason of setting the span length L2 to 90% of the total span length LA or smaller is because setting the same to greater than 90% of the total span length LA results in quickening an air intake velocity on the tip side, thereby making it difficult to sufficiently reduce a shock wave loss on the tip side of the fan rotor blade 21.

The maximum value of the forward tilt angle (positive sweep angle) θt of the forward tilt tip section 53 is set to 5 to 45 degrees, preferably, 10 to 20 degrees. The reason of setting the maximum value of the forward tilt angle θt of the forward tilt tip section 53 to 5 degrees or greater is because setting the same to smaller than 5 degrees results in quickening an air intake velocity on the tip side, thereby making it difficult to sufficiently reduce a shock wave loss on the tip side of the fan rotor blade 21. The reason of setting the maximum value of the forward tilt angle θt of the forward tilt tip section to 45 degrees or smaller is because setting the same to greater than 45 degrees results in biasing the barycenter of the fan rotor blade 21 in the forward direction due to the formation of the forward tilt tip section 53, thereby causing concern that excessive stress may be created around the hub end of the rotor blade leading edge 41.

For the backward tilt hub section 55, a span length L3 from the hub end of the rotor blade leading edge 41 to the distal end of the backward tilt hub section 55 is set to be 5 to 25%, preferably, 10 to 20% of the total span length of the rotor blade leading edge 41. The reason of setting the span length L3 to 5% of the total span length or greater is because setting the same to smaller than 5% of the total span length results in making it difficult to produce a static pressure distribution on the back face of the fan rotor blade 21 so as to press an airflow toward the hub side. The reason of setting the span length L3 to 25% of the total span length or smaller is because setting the same to greater than 25% of the total span length results in shortening the span length of the vertical hub section 49, thereby making it difficult to sufficiently increase a pressure ratio on the hub side.

The maximum value of the backward tilt angle θh of the backward tilt hub section 55 is set to 5 to 45 degrees, preferably, 15 to 25 degrees. The reason of setting the maximum value of the backward tilt angle θh of the backward tilt hub section 55 to 5 to 45 degrees is because setting the same to smaller than 5 degrees or greater than 45 degrees results in making it difficult to create, on the back face of the fan rotor blade 21, a static pressure distribution that may press an airflow toward the hub side.

Operation and effect of the first embodiment of the present invention will be explained.

The vertical hub section 49 is vertical to the axial center S of the fan 1, the forward tilt tip section 53 is forwardly tilted, and the backward tilt mid-span section 51 is backwardly tilted. Accordingly, like the turbine rotor blade of the above-mentioned related art filed by the inventors of this application, stress around the hub end of the rotor blade leading edge 41 is reduced, a chord length on the hub side of the fan rotor blade 21 is sufficiently secured, and a shock wave loss on the tip side of the fan rotor blade 21 is reduced. Since the backward tilt hub section 55 is backwardly tilted, a static pressure distribution to press an airflow toward the hub side is created on the back face of the fan rotor blade 21, to reduce a separation on the hub side.

Accordingly, the first embodiment of the present invention is capable of reducing stress around the hub end of the rotor blade leading edge 41, sufficiently securing a chord length on the hub side of the fan rotor blade 21, and reducing a shock wave loss on the tip side of the fan rotor blade 21. Also, as will be explained later, a separation on the hub side is reduced, and therefore, the structural strength of the fan rotor blade 21 is sufficiently secured, the aerodynamic performance of the fan rotor blade 21, in particular, the fan efficiency of the tip side is improved to highly increase the efficiency of the aircraft engine.

Second Embodiment

The second embodiment of the present invention will be explained with reference to FIGS. 4, 5(a), and 5(b).

Figure 4:
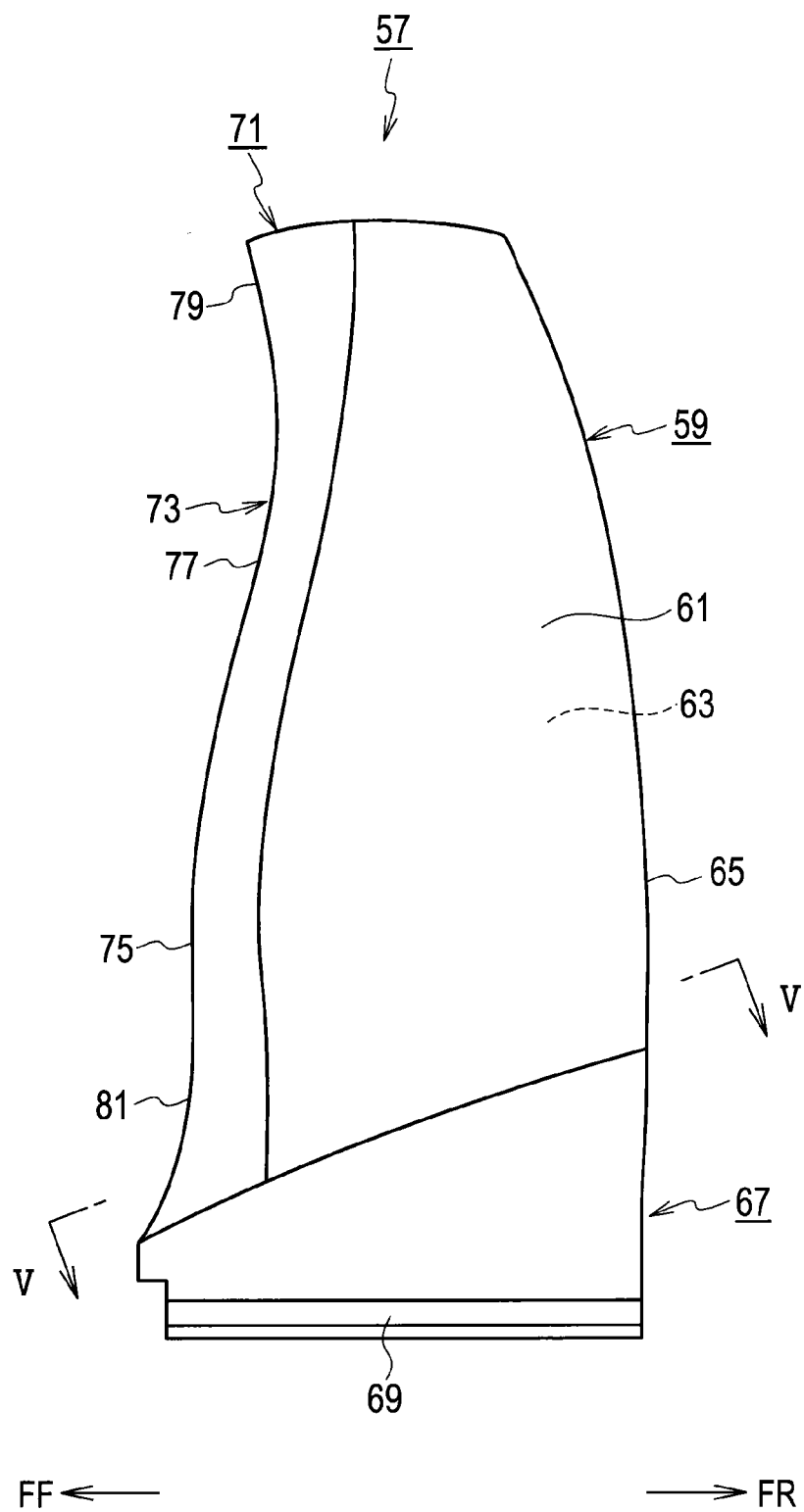
FIG. 4 is a side view of a fan rotor blade according to a second embodiment of the present invention.
Figure 5:
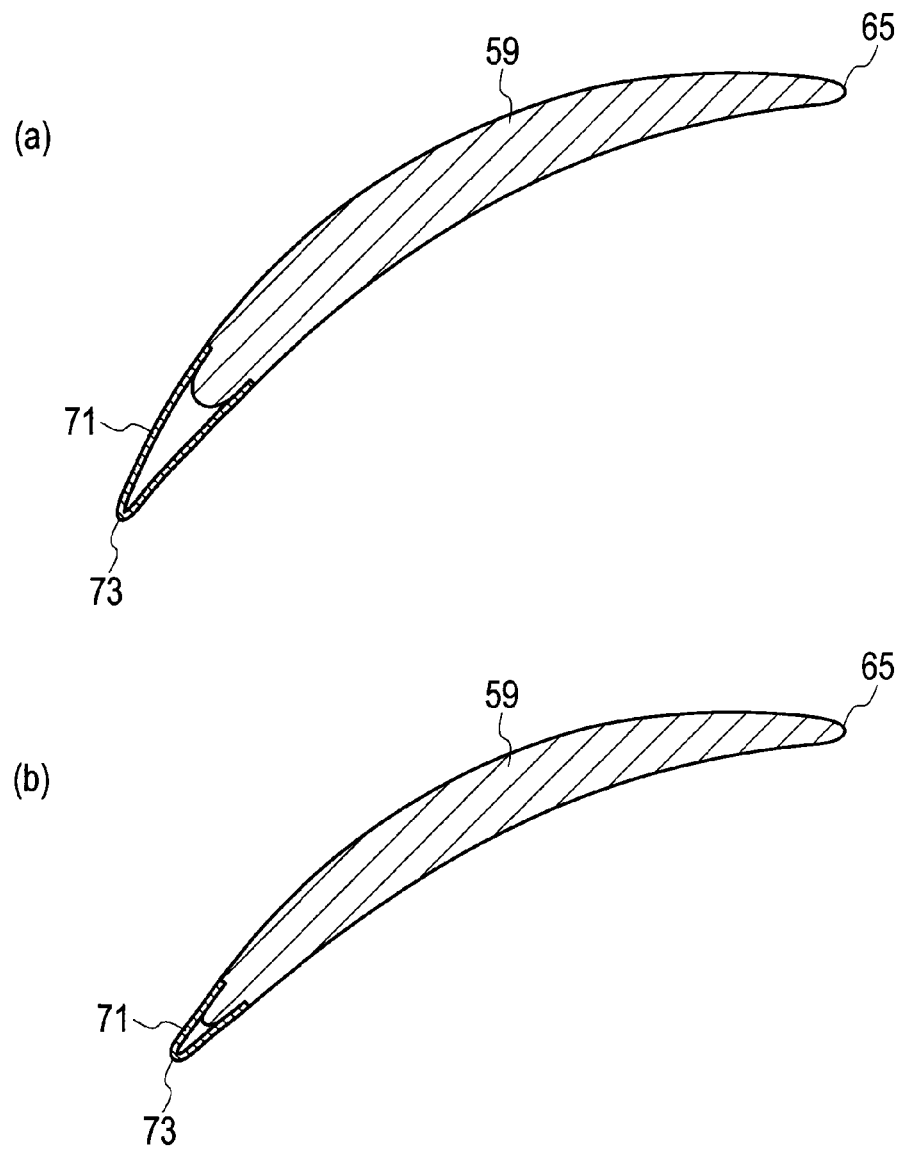
FIG. 5($a$) is a view taken along a line V-V of FIG. 4 and FIG. 5($b$) is a view corresponding to FIG. 5($a$) and illustrating a case without a backward tilt hub section.

As illustrated in FIG. 4, a fan rotor blade 57 according to the second embodiment of the present invention is used for the fan 1 of the aircraft engine, like the fan rotor blade 21 according to the first embodiment of the present invention. A detailed structure of the fan rotor blade 57 will be explained hereunder.

The fan rotor blade 57 has a blade body 59. The blade body 59 is made of a composite material of thermosetting resin such as epoxy resin, phenol resin, polyimide resin, and the like or thermoplastic resin such as polyether ether ketone, polyphenylene sulfide, and the like and reinforcement fiber such as carbon fiber, aramid fiber, glass fiber, and the like. The blade body 59 has a laminated structure (multilayer structure) in a thickness direction (thickness direction of the blade body 59). The blade body 59 has, on one side, a back face (negative pressure face) 61, and on the other side, a front face (positive pressure face) 63. A rear edge of the blade body 59 is a rotor blade trailing edge 65 of the fan rotor blade 57.

On a proximal end side of the blade body 59, there is integrally formed a blade root 67. Like the blade body 59, the blade root 67 is made of a composite material of thermosetting resin or thermoplastic resin and reinforcement fiber and has a laminated structure in a thickness direction (thickness direction of the blade root 67). The blade root 67 has a dovetail 69 to be fitted into the fitting groove 19 of the fan disk 15. An interface between the blade body 59 and the blade root 67 is located on an extension of the inner wall face of the core flow path 5 (refer to FIG. 2).

On a leading edge side of the blade body 59, there is arranged a sheath 71 with a sheet-like adhesive, to protect the leading edge side of the blade body 59. The sheath 71 is made of metal such as titanium alloy. The inside of the sheath 71 is hollow. The inside of the sheath 71 may be solid, or may be provided with a cushioning material (not illustrated).

A front edge of the sheath 71 is a rotor blade leading edge 73 of the fan rotor blade 57. On a hub side of the rotor blade leading edge 73 (the front edge of the sheath 71), there is formed a vertical hub section 75. From a top end (an outer end in a diametral direction) of the vertical hub section 75 to a mid-span side of the rotor blade leading edge 73, there is formed a backward tilt mid-span section 77. From a distal end of the backward tilt mid-span section 77 to a tip end (tip side) of the rotor blade leading edge 73, there is formed a forward tilt tip section 79. From a hub end of the rotor blade leading edge 73 to a proximal end of the vertical hub section 75, there is formed a backward tilt hub section 81. The vertical hub section 75, backward tilt mid-span section 77, forward tilt tip section 79, and backward tilt hub section 81 have configurations similar to those of the vertical hub section 49, backward tilt mid-span section 51, forward tilt tip section 53, and backward tilt hub section 55, respectively, of the rotor blade leading edge 41 of the fan rotor blade 21 according to the first embodiment of the present invention.

According to the second embodiment of the present invention, the vertical hub section 75 and the like have, as mentioned above, configurations similar to those of the vertical hub section 49 and the like of the rotor blade leading edge 41 of the fan rotor blade 21 according to the first embodiment of the present invention, thereby providing operation and effect similar to those of the first embodiment of the present invention.

From the hub end of the front edge of the sheath 71 to the proximal end of the vertical hub section 75, there is formed the backward tilt hub section 81. Compared with a case having no backward tilt hub section 81 along the front edge of the sheath 71 as illustrated in FIGS. 5(a) and 5(b), the hub end and the vicinities thereof of the front edge of the blade body 59 are spaced away from the front edge of the sheath 71. This results in thickening the vicinities of the hub end of the front edge of the blade body 59, sufficiently securing the structural strength of the blade body 59 made of the composite material, and improving the durability of the fan rotor blade 57.

The present invention is not limited to the embodiments mentioned above and is achievable in various forms. The scope of right of the present invention is not limited to the embodiments.

Evaluation of Invention

Figure 6:
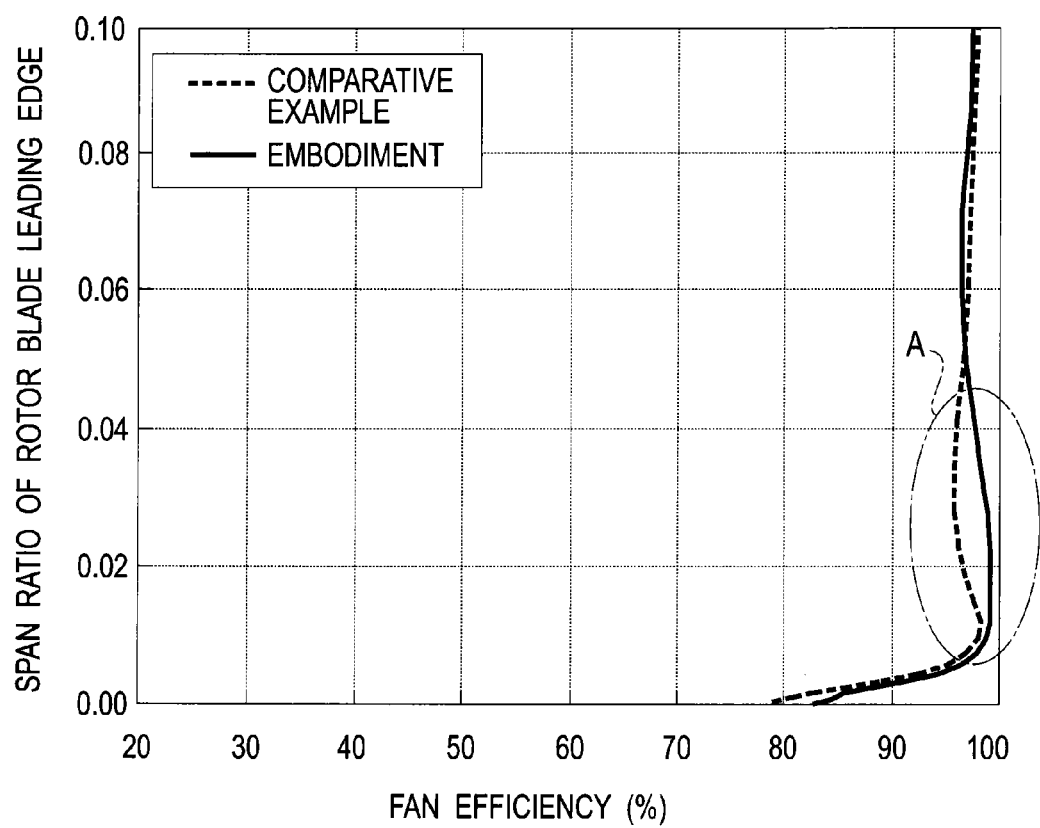
FIG. 6 is a view illustrating a relationship between the fan efficiency of a fan rotor blade and a span ratio of a rotor blade leading edge of the fan rotor blade.
Figure 7:
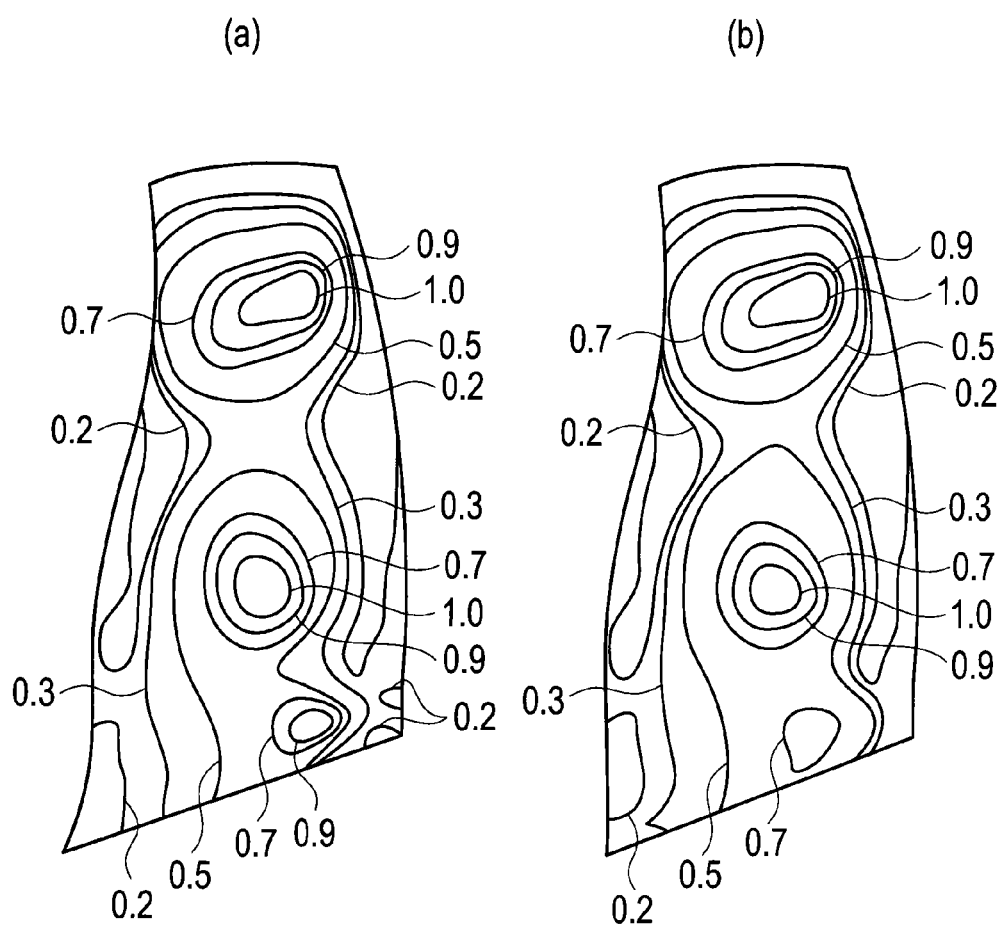
FIG. 7($a$) is a view illustrating a stress distribution state on a back face of the fan rotor blade according to the embodiment during operation of a fan and FIG. 7($b$) is a view illustrating a stress distribution state on a back face of a fan rotor blade according to a comparative example during operation of a fan.

The embodiments of the present invention will be explained with reference to FIGS. 6, 7(a), and 7(b).

The span length L1 is set to 37% of the total span length LA, the maximum value of the backward tilt angle θm to 15 degrees, the span length L2 to 80% of the total span length LA, the maximum value of the forward tilt angle θt to 15 degrees, the span length L3 to 15% of the total span length, and the maximum value of the backward tilt angle θh to 23 degrees, to prepare the fan rotor blade 21 (the fan rotor blade according to the embodiment). Also, a fan rotor blade (a fan rotor blade according to a comparative example) is prepared in the same configuration as the fan rotor blade according to the embodiment except that the backward tilt hub section is omitted. These fan rotor blades are analyzed. Fan efficiency from a span ratio of 0.00 (hub end) to a span ratio of 0.10 is subjected to a three-dimensional steady viscous CFD (Computational Fluid Dynamics) analysis. A result of this is summarized in FIG. 6. Namely, compared with the fan rotor blade according to the comparative example, the fan rotor blade according to the present embodiment improves the fan efficiency of the hub side (a zone A encircled with a dot-and-dash line in FIG. 6).

For the fan rotor blade according to the embodiment and the fan rotor blade according to the comparative example, a stress distribution on the back face during the operation of the fan (during the operation of the aircraft engine) is structurally analyzed. A result of this is illustrated in FIGS. 7(a) and 7(b). Namely, the fan rotor blade according to the embodiment produces no excessive stress along the rotor blade leading edge, like the fan rotor blade according to the comparative example. In FIGS. 7(a) and 7(b), numerals from 0.2 to 1.0 indicate the levels of the stress.

Although not illustrated, the span length L1 is set to 30 to 40% of the total span length LA, the maximum value of the backward tilt angle θm to 10 to 20 degrees, the span length L2 to 75 to 85% of the total span length LA, the maximum value of the forward tilt angle θt to 10 to 20 degrees, the span length L3 to 10 to 20% of the total span length, and the maximum value of the backward tilt angle θh to 15 to 25 degrees, to prepare the fan rotor blade 21 and similar analytic results are obtained.

According to the first technical aspect of the present invention, the vertical hub section is vertical to the axial center of the fan, the forward tilt tip section is forwardly tilted, and the backward tilt mid-span section is backwardly tilted. Accordingly, like the turbine rotor blade according to the above-mentioned related art filed by the inventors of this application, this aspect of the present invention is capable of reducing stress around the hub end of the rotor blade leading edge, sufficiently securing a chord length on the hub side of the fan rotor blade, and reducing a shock wave loss on the tip side of the fan rotor blade. In addition, the backward tilt hub section is backwardly tilted, and therefore, a static pressure distribution that may press an airflow toward the hub side is produced on the back face of the fan rotor blade, thereby reducing a separation (an airflow separation) on the hub side.

According to the second technical aspect of the present invention, in addition to the effects of the first technical aspect, the aircraft engine is started to rotate the fan disk so that the plurality of fan rotor blades are rotated together with the fan disk, to take air into the core flow path and bypass flow path.

The present invention is capable of reducing stress around the hub end of the rotor blade leading edge, sufficiently securing a chord length on the hub side of the fan rotor blade, reducing a shock wave loss on the tip side of the fan rotor blade, and minimizing a separation on the hub side. Accordingly, the present invention is capable of sufficiently securing the structural strength of the fan rotor blade, improving the aerodynamic performance of the fan rotor blade, in particular, the fan efficiency of the tip side, and thereby increasing the efficiency of the aircraft engine.

United States Designation

In connection with United States designation, this international patent application claims the benefit of priority under 35 U.S.C. 119(a) to Japanese Patent Application No. 2010-292658 filed on Dec. 28, 2010 whose disclosed contents are cited herein.

The invention claimed is:

1. A fan rotor blade used for a fan that takes air into an annular core flow path formed inside an engine case of an aircraft engine and an annular bypass flow path formed inside the engine case concentrically with and outside the core flow path, the fan rotor blade comprising:
   a rotor blade leading edge that includes:
      a vertical hub section formed on a hub side and substantially normal to an axial center of the fan;
      a backward tilt mid-span section formed from a top end of the vertical hub section to a mid-span side and backwardly tilted so that a top end thereof is positioned behind a base end thereof;
      a forward tilt tip section formed from the top end of the backward tilt mid-span section to a tip side and forwardly tilted so that a top end thereof is positioned ahead of a base end thereof; and
      a backward tilt hub section formed from a hub end of the rotor blade leading edge to a base end of the vertical hub section and backwardly tilted so that a top end thereof is positioned behind a base end thereof,
   wherein an absolute value of a backward tilt angle of the backward tilt hub section becomes maximum at the base end thereof, gradually decreases toward the vertical hub section, and is smoothly connected to the vertical hub section having a sweep angle of substantially zero degrees, the backward tilt angle having a negative sweep angle throughout the backward tilt hub section between the base end of the backward tilt hub section and the top end of the backward tilt hub section.

2. The fan rotor blade according to claim 1, wherein:
   a first span length from the hub end of the rotor blade leading edge to the top end of the vertical hub section is set to be 20 to 50% of a total span length of the rotor blade leading edge;
   a second span length from the hub end of the rotor blade leading edge to the top end of the backward tilt hub section is set to be 5 to 25% of the total span length of the rotor blade leading edge; and
   a maximum absolute value of the backward tilt angle of the backward tilt hub section is set to be 5 to 45 degrees.

3. The fan rotor blade according to claim 1, wherein:
   a third span length from the hub end of the rotor blade leading edge to the base end of the forward tilt tip section is set to be 60 to 90% of the total span length of the rotor blade leading edge; and
   a maximum absolute value of a forward tilt angle of the forward tilt tip section is set to be 5 to 45 degrees.

4. The fan rotor blade according to claim 1, comprising:
   a blade body made of a composite material of thermosetting resin or thermoplastic resin and reinforcement fiber;
   a blade root formed integral with a base end side of the blade body and made of a composite material of thermosetting resin or thermoplastic resin and reinforcement fiber; and
   a sheath arranged on a front edge side of the blade body, made of metal, and protecting the front edge side of the blade body, the front edge of the sheath being the rotor blade leading edge.

5. A fan taking air into an annular core flow path formed inside an engine case of an aircraft engine and a bypass flow path formed inside the engine case concentrically with and outside the core flow path, comprising:
   a fan disk being rotatable, arranged around an axial center in the engine case, and provided with a plurality of fitting grooves on an outer circumferential face thereof at regular intervals in a circumferential direction; and
   the fan rotor blade according to claim 1 fitted into each of the fitting grooves of the fan disk.

6. The fan rotor blade according to claim 1, wherein:
   a maximum absolute value of an angle of the vertical hub section is less than a maximum absolute value of a backward tilt angle of the backward tilt mid-span section, and
   the maximum absolute value of the angle of the vertical hub section is less than a maximum absolute value of a forward tilt angle of the forward tilt tip section.

* * * * *